United States Patent Office 3,816,393
Patented June 11, 1974

3,816,393
CLATHRATE COMPOUNDS OF PROSTAGLANDINS OR THEIR ANALOGUES WITH CYCLODEXTRIN
Masaki Hayashi, Takatsuki, and Atsunobu Ishihara, Ibaraki, Japan, assignors to Ono Pharmaceutical Co., Ltd., Osaka, Japan
No Drawing. Filed May 26, 1971, Ser. No. 147,255
Claims priority, application Japan, June 10, 1970, 45/50,119
Int. Cl. C08b 19/00
U.S. Cl. 260—209 R
18 Claims

ABSTRACT OF THE DISCLOSURE

This invention relates to clathrate compounds of prostaglandins or their analogues with cyclodextrin. It also relates to a process for producing clathrate compounds of prostaglandins or their analogues with cyclodextrin, characterized by reacting prostaglandins or their analogues react with cyclodextrin. Further the present invention relates to the use of clathrate compounds of prostaglandins or their analogues with cyclodextrin in pharmaceutical forms.

---

A prostaglandin group of compounds exists in various tissues of animals and is noted as a new hormone which is secreted by the living body itself and gives effects on blood pressure, smooth muscle, lipid metabolism, platelet aggregation, gastric secretion and the like at a slight dose.

"Prostaglandin" is a general term for a group of compounds which contain the carbon skeleton of prostanoic acid. As primary compounds among them, there may be mentioned prostaglandin $E_1$ (hereinafter referred to as PGE$_1$), prostaglandin $E_2$ (hereinafter referred to as PGE$_2$), prostaglandin $A_1$ (hereinafter referred to as PGA$_1$), prostaglandin $A_2$ (hereinafter referred to as PGA$_2$), prostaglandin $F_{1\alpha}$ (hereinafter referred to as PGF$_{1\alpha}$), and prostaglandin $F_{2\alpha}$ (hereinafter referred to as PGF$_{2\alpha}$), which naturally occur in the living body and have potensive pharmacological activities. The structural formula of prostanoic acid is as follows:

These compounds are useful as hypotensive agents, remedies for gastric ulcer, contraceptives, labor-inducing agents, anti-thrombotic agents and remedies for asthma. Thus, more particularly, PGE$_1$, and PGE$_2$ are useful as hypotensive agents, remedies for gastric ulcer, remedies for asthma, contraceptives and labor-inducing agents. PGE$_1$ is also useful as an anti-thrombotic agent, PGF$_{1\alpha}$ and PGF$_{2\alpha}$ as contraceptives and labor-inducing agents and PGA$_1$ and PGA$_2$ as hypotensive agents.

Further, the compounds containing the carbon skeletons similar to that of prostanoic acid have biological activities as well as prostaglandins and some of them exert much more excellent effects than prostaglandins. For example, the compound, to the C-15 of C-16 position of which methyl group is introduced, usually has a more durability and potensive activity compared with the corresponding prostaglandin. ω-Homo PGE$_1$ has a more superior effect of inhibiting platelet aggregation than PGE$_1$. In case functional group(s) of prostaglandins or compounds containing the carbon skeletons similar to that of prostanoic acid is substituted by other functional group(s), the resulting compounds also have excellent effects. For example, PGE$_2$ decyl ester shows a duration in gastric secretion inhibiting effect and when used in therapy for gastric ulcer, its side effects, that is, hypertensive effect and smooth muscle contracting effect are far weaker than PGE$_2$. Further, PGE$_2$-9-carboethoxy nonyl ester shows a more potensive effect than PGE$_2$ in therapy for asthma.

As mentioned above, prostaglandins and their analogues are expected as remedies for various diseases but these are unstable so that there is difficulty in their application in pharmaceutical forms. Among naturally occurring prostaglandin group of compounds, PGE group is most unstable because the OH group of the 5 membered ring is easily eliminated under the influence of the C-9 carbonyl group as shown by the following formula:

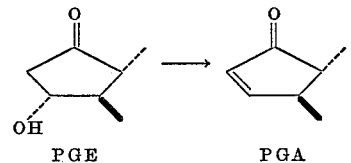

PGE          PGA

The elimination of the OH group results in the formation of prostaglandin A containing a double bond in the ring. Furthermore, PGE analogues have the tendency similar to PGE compounds.

In the case of the other prostaglandins or their analogues, they are also unstable compared with other drugs because of their presence of double bonds or OH groups in their structures.

By reacting prostaglandin analogues with various host molecules, we examined whether the clathrate compound was formed or not and investigated the structures and stabilities of the resulting products, i.e. clathrate compounds. As a result, we have found that cyclodextrin clathrate compounds are obtained as white powdery substances when cyclodextrin is used for a host molecule and that each of the resulting clathrate compounds is highly stable.

The above finding is unexpected because when urea or thiourea is used for a host molecule, prostaglandins or their analogues do not form the clathrate compounds therewith. Clathrate compounds of urea, cyclodextrin or the like have been used hitherto in order to stabilize various substances. However, that is because clathrate compounds are considered to be effective in preventing photo-oxidative decomposition of a double bond or the like, but the fact that cyclodextrin clathrate compounds effectively prevent the elimination of OH group as in this invention has never been known.

Prostaglandin or analogues thereof to be employed in producing cyclodextrin clathrate compounds according to this invention are those which contain the carbon skeleton of prostanoic acid or ones similar to that of prostanoic acid. The prostaglandins or their analogues may have a methyl group introduced to the side chain. Further, carboxylic acid moiety in the prostaglandins or analogues thereof may be in the form of ester with a rather bulky substituent group.

With regard to cyclodextrin, both α, β and γ-mixed cyclodextrin and β-cyclodextrin may be used for producing the clathrate compounds.

In preparing the clathrate compounds, cyclodextrin dissolved in water or in an organic solvent miscible with water is added to a prostaglandin analogue compound dissolved in an organic solvent which is miscible with water. After the mixture is heated, the desired product is obtained by concentrating the mixture under reduced pressure or leaving it to be cooled. In this case, the mixing ratio of organic solvent with water may be suitably varied according to the solubilities of the starting materials and products. Due to the low thermostabilities of the gest molecules, it is preferable that this reaction is conducted at a temperature below 70° C. Especially in the case of PGE or its analogues, it is preferable to conduct the reaction at a temperature of 20–60° C.

The process for producing the clathrate compounds will be illustrated by the following examples.

EXAMPLE 1

350 ml. of β-cyclodextrin were heated and dissolved in 4.7 ml. of water and the solution was added to 2.14 mg. of $PGE_2$ dissolved in 0.3 ml. of ethanol. After the mixture was heated to dissolve at 60° C., it was cooled slowly to room temperature, to obtain a precipitate. After having left to stand overnight at 60° C., the precipitate was recovered by filtration and washed with 50% aqueous ethanol and dried under reduced pressure to obtain 300 mg. of desired product. The content of $PGE_2$ in the product was 4.7%.

EXAMPLE 2

A solution prepared by heating and dissolving 523 mg. of β-cyclodextrin in 4.7 ml. of water was added to a solution prepared by dissolving 20.9 mg. of $PGE_2$ decyl ester in 2.8 ml. of ethanol. The mixture was heated to dissolve at 60° C. and then treated in the same manner as in Example 1 to obtain the desired product. The yield was 180 mg. The content of $PGE_2$ decyl ester in the product was 9.4%.

EXAMPLE 3

A solution prepared by heating and dissolving 480 mg. of β-cyclodextrin in 4.7 ml. of water was added to a solution prepared by dissolving 21.7 mg. of $PGE_1$ decyl ester in 2.8 ml. of ethanol. The mixture was heated to dissolve at 60° C. and then treated in the same manner as in Example 1 to obtain the desired product. The yield was 210 mg. The content of $PGE_1$ decyl ester was 7.9%.

EXAMPLE 4

A solution prepared by heating and dissolving 358 mg. of β-cyclodextrin in 4 ml. of water was added to a solution prepared by dissolving 23.8 mg. of $PGA_2$ in 1.0 ml. of ethanol. The mixture was heated to dissolve at 60° C. and then treated in the same manner as in Example 1 to obtain the desired product. The yield was 230 mg. The content of $PGA_2$ in the product was 8%.

EXAMPLE 5

A solution prepared by heating and dissolving 776 mg. of β-cyclodextrin in 6.6 ml. of water was added to a solution prepared by dissolving 28.8 mg. of $PGA_2$ decyl ester in 4.4 ml. of ethanol. The mixture was heated to dissolve at 60° C. and then treated in the same manner as in Example 1 to obtain the desired product. The yield was 260 mg. The content of $PGA_2$ decyl ester in the product was 10.8%.

EXAMPLE 6

A solution prepared by heating and dissolving 340 mg. of β-cyclodextrin in 4.7 ml. of water was added to a solution prepared by dissolving 27 mg. of $PGF_{2\alpha}$ in 0.3 ml. of ethanol. The mixture was heated to dissolve at 60° C. and then treated in the same manner as in Example 1 to obtain the desired product. The yield was 280 mg. The content of $PGF_{2\alpha}$ in the product was 2.6%.

EXAMPLE 7

A solution prepared by heating and dissolving 526 mg. of β-cyclodextrin in 11.8 ml. of water was added to a solution prepared by dissolving 30.73 mg. of $PGE_1$ alcohol in 0.3 ml. of ethanol. The mixture was heated to dissolve at 45° C. and then gradually cooled to the room temperature to form precipitate. After having been left standing overnight at 0° C., the precipitate was recovered by filtration and was washed with a 50% aqueous solution of ethanol and was dried under a reduced pressure to obtain 229 mg. of the desired product. The content of $PGE_1$ alcohol in the product was 6.2%.

EXAMPLE 8

A solution prepared by heating and dissolving 257 mg. of β-cyclodextrin in 6.0 ml. of water was added to a solution prepared by dissolving 16.94 mg. of α-methyl $PGE_1$ in 0.2 ml. of ethanol. The mixture was heated to dissolve at 45° C. and then treated in the same manner as in Example 7 to obtain 103 mg. of the desired product. The content of α-methyl $PGE_1$ in the product was 10.3%.

EXAMPLE 9

A solution prepared by heating and dissolving 268 mg. of β-cyclodextrin in 6.1 ml. of water was added to a solution prepared by dissolving 25.40 mg. of $PGE_2$-9-carboethoxynonyl ester in 0.3 ml. of ethanol. The mixture was heated to dissolve at 45° C. and then treated in the same manner as in Example 7 to obtain 154 mg. of the desired product. The content of $PGE_2$-9-carboethyoxynonyl ester in the product was 5.9%.

EXAMPLE 10

A solution prepared by heating and dissolving 251 mg. of β-cyclodextrin in 6.0 ml. of water was added to a solution prepared by dissolving 14.42 mg. of PG 234 in 0.2 ml. of ethanol. The mixture was heated to dissolve at 45° C. and then treated in the same manner as in Example 7 to obtain 143 mg. of the desired product. The content of PG 234 in the product was 5.5%.

EXAMPLE 11

A solution prepared by heating and dissolving 255 mg. of β-cyclodextrin in 6.0 ml. of water was added to a solution prepared by dissolving 17.37 mg. of α-methyl $PGE_2$ in 0.2 ml. of ethanol and the mixture was heated to dissolve at 45° C. and then treated in the same manner as in Example 7 to obtain 154 mg. of the desired product. The content of α-methyl $PGE_2$ in the product was 9.5%.

EXAMPLE 12

A solution prepared by heating and dissolving 165 mg. of β-cyclodextrin in 3.7 ml. of water was added to a solution prepared by dissolving 10.44 mg. of 16-methyl $PGE_2$ (B) in 0.2 ml. of ethanol. The mixture was heated to dissolve at 45° C. and then treated in the same manner as in Example 7 to obtain 159 mg. of the desired product. The content of 16-methyl $PGE_2$ (B) in the product was 12.1%.

EXAMPLE 13

A solution prepared by heating and dissolving 480 mg. of β-cyclodextrin in 11.0 ml. of water was added to a solution prepared by dissolving 30.21 mg. of 17-methyl $PGE_2$ (B) in 0.3 ml. of ethanol. The mixture was heated to dissolve at 45° C. and then treated in the same manner as in Example 7 to obtain 146 mg. of the desired product. The content of 17-methyl $PGE_2$ (B) in the product was 10.8%.

EXAMPLE 14

A solution prepared by heating and dissolving 490 mg. of β-cyclodextrin in 11.0 ml. of water was added to a solution prepared by dissolving 31.18 mg. of 15-methyl $PGE_2$ (B) in 0.3 ml. of ethanol. The mixture was heated to dissolve at 45° C. and then treated in the same manner as in Example 7 to obtain 285 mg. of the desired product. The content of 15-methyl $PGE_2$ (B) in the product was 2.3%.

EXAMPLE 15

A solution prepared by heating and dissolving 224 mg. of β-cyclodextrin in 6.0 ml. of water was added to a solution prepared by dissolving 6.84 mg. of 16-methyl $PGE_2$ (B) alcohol in 0.2 ml. of ethanol. The mixture was heated to dissolve at 45° C. and was then treated in the same manner as in Example 7 to obtain 224 mg. of the desired product. The content of 16-methyl $PGE_2$ (B) alcohol in the product was 3.0%.

EXAMPLE 16

A solution prepared by heating and dissolving 239 mg. of β-cyclodextrin in 6.0 ml. of water was added to a solution prepared by dissolving 6.95 mg. of 16-methyl PGE$_2$ (B) decyl ester in 0.2 ml. of ethanol. The mixture was heated to dissolve at 45° C. and then treated in the same manner as in Example 7 to obtain 198 mg. of the desired product. The content of 16-methyl PGE$_2$ (B) decyl ester in the product was 3.0%.

In all of the above Examples, the obtained clathrate compounds were white powdery substances and their infrared spectra showed absorptions of carbonyl groups at 1710–1740 cm.$^{-1}$ in the case of PGE, PGA and their analogues. The binding ratios of prostaglandins or their analogues with cyclodextrin in the clathrate compounds (i.e. content of prostaglandins or analogues thereof in the products) were determined by quantitative analysis of prostaglandins or their analogues in the clathrate compounds. The quantitative analysis was conducted in the following manner. Thus, PGA, PGE and their analogues isomerized with alkali to PGB or their analogues and their absorption values in UV spectra were determined at wavelength 278 mμ. In the case of PGF of their analogues, a contraction of guinea pig colon was employed in the determination.

It was confirmed by stability tests against heating that the clathrate compounds of this invention have excellent stabilities compared with the original prostaglandins. Table 1 shows contents of PGs or their analogues in the clathrate compounds and results of stability tests against heating at 106±4° C. when cyclodextrin is used as a host molecule for prostaglandins or their analogues.

TABLE 1
Stabilities against heat of clathrate compounds of prostaglandins or their analogues with cyclodextrin.

| Names and structures of prostaglandins or their analogues compounds | Contents,[1] percent | | Stability against heat,[2] percent | | | |
|---|---|---|---|---|---|---|
| | | | 1 hour | 3 hours | 8 hours | 30 hours |
| PGE$_2$ | 4.7 | PG-CD[3] | 97.5 | 92.8 | 90.6 | |
| | | PG[4] | 77.0 | 55.0 | 29.8 | |
| PGE$_2$ decyl ester | 9.4 | PG-CD | 89.1 | 96.8 | 95.2 | |
| | | PG | 94.5 | 89.1 | 72.3 | |
| PGE$_1$ decyl ester | 7.9 | PG-CD | 99.2 | 98.5 | 97.2 | |
| | | PG | 95.2 | 89.9 | 73.4 | |
| PGA$_2$ | 8.0 | PG-CD | 99.8 | 98.8 | 98.1 | |
| | | PG | 99.4 | 98.3 | 95.6 | |
| PGA$_2$ decyl ester | 10.8 | PG-CD | 99.8 | 99.2 | 98.6 | |
| | | PG | 99.5 | 98.6 | 97.0 | |
| PGF$_{2\alpha}$ | 2.6 | PG-CD | 100 | 100 | 99 | |
| | | PG | 100 | 99 | 99 | |
| PGE$_1$ alcohol | 6.2 | PG-CD | 92.9 | 92.8 | 88.0 | 79.1 |
| | | PG | 95.4 | 93.8 | 84.9 | 59.8 |

TABLE 1—Continued

| Names and structures of prostaglandins or their analogues compounds | Contents,[1] percent | Stability against heat,[2] percent | | | |
|---|---|---|---|---|---|
| | | | 1 hour | 3 hours | 8 hours | 30 hours |
| α-Methyl PGE$_1$ | 10.3 | PG-CD | 97.4 | 88.5 | 90.5 | |
| | | PG | 82.1 | 69.2 | 55.2 | |
| α-Methyl PGE$_2$ | 9.5 | PG-CD | 96.6 | 92.5 | 91.9 | |
| | | PG | 94.4 | 69.1 | 61.7 | |
| PG 234 | 5.6 | PG-CD | 96.3 | 96.3 | 95.6 | |
| | | PG | 54.9 | 48.8 | 46.0 | |
| PGE$_2$-9-carbo- | 5.9 | PG-CD | 100.0 | 96.4 | 97.3 | 94.2 |
| | | PG | 97.5 | 93.8 | 90.8 | 69.6 |
| 16-methyl PGE$_2$ | 12.1 | PG-CD | 97.8 | 92.1 | 87.9 | |
| | | PG | 75.9 | 62.9 | 45.6 | |
| 17-methyl PGE$_2$ | 10.8 | PG-CD | 98.7 | 97.9 | 97.4 | |
| | | PG | 76.9 | 66.7 | 59.9 | |
| 15-methyl PGE$_2$ | 2.3 | PG-CD | 86.8 | 86.5 | 83.4 | |
| | | PG | 65.4 | 49.4 | 43.6 | |
| 16-methyl PGE alcohol | 3.0 | PG-CD | 98.7 | 90.9 | 91.9 | |
| | | PG | 84.4 | 66.2 | 63.0 | |
| 16-methyl PGE$_2$ decyl ester | 3.0 | | | | | |

[1] The contents are represented by percentages (w./w.) of prostaglandins or their analogues in the clathrate compounds.
[2] The percentages of prostaglandins or their analogue compounds remaining stable at 106°±4° C.
[3] In the table, PG-CD represents cyclodextrin clathrate compounds of prostaglandins or their analogues.
[4] In the table, PG represents prostaglandins or their analogues.

As shown in Table 1, there is a great variety in contents of prostaglandins or their analogues in the clathrate compounds according to structures of the compounds. With regard to stabilities against heating, the clathrate compounds are shown to be much more stable than the original prostaglandins or their analogues. Such stable prostaglandins have never been known up to the present. It would be significant in this respect that, according to the invention, the cyclodextrin clathrate compounds first enabled to use prostaglandins in pharmaceutical forms. Since all the obtained clathrate compounds are white powdery and so easy to deal with, they are very useful for various pharmaceutical forms such as injection, tablets, aerosol, powder and the like.

The following examples illustrate the same procedures for making the clathrate compounds of this invention into pharmaceutical forms.

EXAMPLE 17

PGE$_2$-cyclodextrin tablet for vagina

|  | G. |
|---|---|
| Avicel (micro crystalline cellulose) | 10 |
| Mannite | 12.5 |
| Tartaric acid | 10 |
| Sodium bicarbonate | 10 |
| ECG 505 (Carboxy methyl cellulose-calcium) | 2 |

Granules are made by mixing well the above ingredients and adding to the mixture 0.5 g. of PVP (polyvinylpyrrolidone) dissolved in a small amount of methanol as a binder. After dried satisfactorily, the granules were passed through the 12 mesh sieve to obtain uniform size granules. To these granules were added the following ingredients:

|  | G. |
|---|---|
| PGE$_2$-CD (PG content 8%) | 2.5 |
| ECG 505 (carboxymethyl cellulose-calcium) | 2 |
| Magnesium stearate | 0.5 |

Effervescent tablets for vagina containing 2 mg. of PGE$_2$ in each tablet were obtained by tableting the mixture into tablets each 500 mg. of weight.

EXAMPLE 18

PGE$_2$-cyclodextrin tablet

Granules were made by mixing well 17.5 g. of lactose and 3.89 g. of starch and adding HPC (hydroxy propyl cellulose) in 0.5 g. of methanol as a binder. After dried satisfactorily, they were sieved through the 12 mesh sieve to obtain uniform size granules. After adding to the granules 2.86 g. of PGE$_2$-cyclodextrin (PG content 7%) and 250 mg. of magnesium stearate, tablets are made, each being 8.5 mm. in diameter and 250 mg. in weight. Each tablet contained 2 mg. of PGE$_2$.

EXAMPLE 19

PGE$_2$-decyl ester-cyclodextrin capsule

|  | G. |
|---|---|
| PGE$_2$ decyl ester-cyclodextrin (PG content 9.4%) | 0.43 |
| Mannite | 3 |
| Corn starch | 0.4 |

The above agents were mixed well and sieved through 32-mesh sieve several times. After that, 220 mg. of the mixture was packed in each No. 3 hard capsule. Each capsule contained 2 mg. of PGE$_2$ decyl ester.

EXAMPLE 20

PGE$_2$-cyclodextrin injection

Powdery PGE$_2$-cyclodextrin (PG content 8%) was subdivided into ampoules so that each contains 12.5 mg. under a sterile condition. Each ampoule was substituted by nitrogen gas and sealed. This was useful as an injection containing 1 mg. of PGE$_2$ when dissolved in a 0.9% saline solution for injection.

EXAMPLE 21

PGF$_{2\alpha}$cycylodextrin powder

|  | G. |
|---|---|
| PGF$_2$-cyclodextrin (PG content 2%) | 20 |
| Potato starch | 90 |

The above agents were mixed well and sieved through 42-mesh sieve. Then 400 g. of lactose were added to the mixture and again sieved through 42-mesh sieve. Further, they were mixed to obtain 0.1% PGF$_{2\alpha}$ powder.

When this invention is practically applied to pharmaceutical uses, it is also possible to make a pharmaceutical preparation comprising a mixture of the clathrate compounds of prostaglandins or their analogues with cyclodextrin and free cyclodextrin by using an excess of cyclodextrin in the reaction with prostaglandins or their analogues.

The biological activities of the clathrate compounds of this invention, that is to say, hypotensive effects, contractive effects of uterine or intestinal smooth muscle, gastric secretion inhibiting effects or the like, were almost similar to those of the original prostaglandins or their analogues. And the toxicity of the cyclodextrin is so low that if intravenously injected to male mice at a dosage of more than 1 g./kg., none of them die. Consequently there is no obstacle in the appliction of these clathrate compounds to medical use.

As explained above the clathrate compounds of this invention are useful as various therapeutic preparations in various pharmaceutical forms. The administrative dosage may vary over a wide range depending upon particular prostaglandin compound used, particular manner of administration, particular pharmaceutical form and particular disease to be treated. The following examples illustrate some typical actual uses of the agents.

Labor-inducing agents

A labor-inducing agent in the form of vagina tablet, tablet, capsule or powder containing PGE$_2$-cyclodextrin may be administered in a total amount of 60–120 mg. (as PGE$_2$-cyclodextrin) as divided into 3–6 times with an interval of about 2–3 hours. A vagina tablet is inserted in the vagina, while tablet, capsule or powder is administered orally. In case of infusion, the administration is conducted for a long time and in an amount of 5–30 mg.

PGF$_{2\alpha}$-cyclodextrin may be administered in the same manner except that the total dosage in the form of vagina tablet, tablet, capsule or powder is 250 mg.–5 g., while in the case of infusion it is 100 mg.–1 g.

Contraceptive

A contraceptive agent in the form of vagina tablet, tablet, capsule or powder containing PGE$_2$-cyclodextrin may be administered in a total amount of 200 mg. to 1.2 g. (as PGE$_2$-cyclodextrin) as divided into 2–3 times with an interval of about 2 3 hours. A vagina tablet is inserted in the vagina, while tablet, capsule or powder is administered orally. In case of infusion, the administration is conducted for a long time with a total dosage of 20 mg.–150 mg.

PGF$_{2\alpha}$-cyclodextrin may be administered in the same manner except that the total dosage in the form of vagina tablet, tablet, capsule or powder is 1–8 g. while in the case of infusion it is 500 mg.–5 g.

Remedy for ulcer

For remedy for ulcer, PGE$_2$-cyclodextrin in the form of tablet, capsule or powder may be continuously and orally administered with a dosage of 5–50 mg. (as PGE$_2$-cyclodextrin)/day/adult.

PGE$_2$ decylester-cyclodextrin may be administered in the same manner except that the dosage is 40–400 mg./day/adult.

Hypotensive agent

As hypotensive agent, PGE$_2$-cyclodextrin in the form of tablet, capsule or powder may be administered orally in an amount of 2.5–25 mg. (as PGE$_2$-cyclodextrin). In case of intramuscular injection the dosage may be 1–10 mg.

PGA$_2$ decylester-cyclodextrin may be administered orally in the same manner except that the sodage is 20–200 mg.

Remedy for asthma

For remedy for asthma, an aerosal agent containing PGE$_1$ alcohol-cyclodextrin and/or PGE$_2$-9-carboethoxy-estercyclodextrin may be sprayed in an amount of 100 μg. to 500 μg. (as the clathrate compound) at a time.

What we claim is:
1. Prostaglandin cyclodextrin clathrate.
2. PGE$_2$ β-cyclodextrin clathrate.
3. PGE$_2$-decyl ester β-cyclodextrin clathrate.
4. PGE$_1$ decylester β-cyclodextrin clathrate.
5. PGA$_2$ β-cyclodextrin clathrate.
6. PGA$_2$ decyl ester β-cyclodextrin clathrate.
7. PGF$_{2\alpha}$ β-cyclodextrin clathrate.
8. PGE$_1$ alcohol β-cyclodextrin clathrate.
9. α-Methyl PGE$_1$ β-cyclodextrin clathrate.
10. PGE$_2$ - 9 - carboethoxynonylester β - cyclodextrin clathrate.
11. PG-234 β-cyclodextrin clathrate.
12. α-Methyl PGE$_2$ β-cyclodextrin clathrate.
13. 16-Methyl PGE$_2$(B) β-cyclodextrin clathrate.
14. 17-Methyl PGE$_2$(B) β-cyclodextrin clathrate.
15. 15-Methyl PGE$_2$(B) β-cyclodextrin clathrate.
16. 16 - Methyl PGE$_2$(B) alcohol β - cyclodextrin clathrate.
17. 16 - Methyl PGE$_2$(B) decylester β - cyclodextrin clathrate.
18. A cyclodextrin clathrate compound of a compound having the structure:

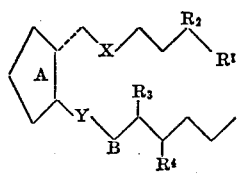

wherein A is

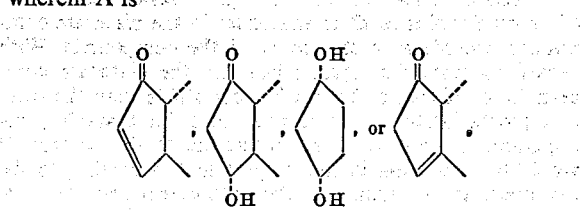

B is

when R$_3$ or R$_4$ is hydrogen or when R$_3$ or R$_4$ is methyl, wherein R$_5$ is hydrogen or methyl, X is —CH$_2$CH$_2$—, or —CH=CH, R$_1$ is —CH$_2$OH or —COOR$_6$, R$_2$, R$_3$, and R$_4$ are hydrogen, or one of R$_2$, R$_3$, and R$_4$ is methyl and the rest are hydrogen, R$_6$ is hydrogen or a straight chain alkyl group having 1 to 10 carbon atoms which is unsubstituted or substituted with an oxygen-containing group, and Y is trans

—CH=CH—.

References Cited
UNITED STATES PATENTS

| | | | |
|---|---|---|---|
| 2,827,452 | 3/1958 | Schlenk et al. | 260—209 D |
| 3,140,184 | 7/1964 | Robbins | 260—209 D |
| 3,426,011 | 2/1969 | Parmerter et al. | 260—209 D |
| 3,453,260 | 7/1969 | Parmerter et al. | 260—209 D |
| 3,472,835 | 10/1969 | Buckler et al. | 260—209 D |

JOHNNIE R. BROWN, Primary Examiner

U.S. Cl. X.R.

424—180, 305